United States Patent
Rovik

(10) Patent No.: US 10,431,017 B2
(45) Date of Patent: Oct. 1, 2019

(54) FUEL LEVEL INDICATION IN A VEHICLE

(71) Applicant: Toyota Motor Engineering & Manufacturing North America, Inc., Erlanger, KY (US)

(72) Inventor: Christopher Lee Rovik, Northville, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 232 days.

(21) Appl. No.: 15/488,333

(22) Filed: Apr. 14, 2017

(65) Prior Publication Data

US 2018/0299313 A1   Oct. 18, 2018

(51) Int. Cl.
  *G07C 5/08*   (2006.01)
  *B60K 15/03*   (2006.01)
  *B60R 16/023*   (2006.01)
  *G01C 21/34*   (2006.01)
  *G01C 21/36*   (2006.01)

(52) U.S. Cl.
  CPC .............. *G07C 5/08* (2013.01); *B60K 15/03* (2013.01); *B60R 16/0236* (2013.01); *B60K 2015/03217* (2013.01); *B60K 2370/174* (2019.05); *B60L 2250/16* (2013.01); *B60L 2260/52* (2013.01); *B60L 2260/54* (2013.01); *G01C 21/3469* (2013.01); *G01C 21/3697* (2013.01)

(58) Field of Classification Search
  CPC ...... G07C 5/08; B60R 16/0236; B60K 15/03; B60K 2350/1092; B60K 2015/03217; B60L 2250/16; B60L 2260/54; B60L 2260/52; G01C 21/3469; G01C 21/3697
  See application file for complete search history.

(56) References Cited

U.S. PATENT DOCUMENTS

| | | | |
|---|---|---|---|
| 4,912,646 A * | 3/1990 | Cerruti ................ | G01F 23/0076 702/55 |
| 5,483,109 A | 1/1996 | Gholston | |
| 7,177,738 B2 * | 2/2007 | Diaz ...................... | G07C 5/008 701/29.3 |
| 7,693,651 B2 * | 4/2010 | Proefke et al. ....... | B60W 50/08 701/123 |
| 7,755,472 B2 | 7/2010 | Grossman | |
| 9,080,529 B1 | 7/2015 | Klughart | |
| 2004/0062963 A1 * | 4/2004 | Umayahara et al. ........ | B60L 2250/16 701/123 |
| 2010/0042340 A1 | 2/2010 | Piszko | |

(Continued)

FOREIGN PATENT DOCUMENTS

GB   2511349 A *   9/2014   .........   G01C 21/3697

*Primary Examiner* — Dale W Hilgendorf
(74) *Attorney, Agent, or Firm* — Christopher G. Darrow; Darrow Mustafa PC

(57) ABSTRACT

The indication of a fuel level in a vehicle is disclosed herein. The vehicle can monitor the ignition switch to determine whether the vehicle is on or off. Also, the vehicle can determine a fuel level when state of the vehicle changes (e.g., switches from on to off, and vice versa). When the fuel level at the on state (e.g., ignition-on fuel level) is different from the fuel level at the off state, the vehicle can determine whether the vehicle is located at a fueling station. If the vehicle is located at the fueling station, the vehicle can generate an indication of the ignition-on fuel level within a user interface.

16 Claims, 3 Drawing Sheets

(56) References Cited

U.S. PATENT DOCUMENTS

| | | |
|---|---|---|
| 2010/0145638 A1 | 6/2010 | Begin |
| 2013/0173106 A1* | 7/2013 | Konishi .............. B60L 2250/16 |
| | | 701/123 |
| 2016/0349075 A1* | 12/2016 | Son .................... G01C 21/3697 |
| 2017/0363456 A1* | 12/2017 | Tonnita et al. .... G01C 21/3469 |

* cited by examiner

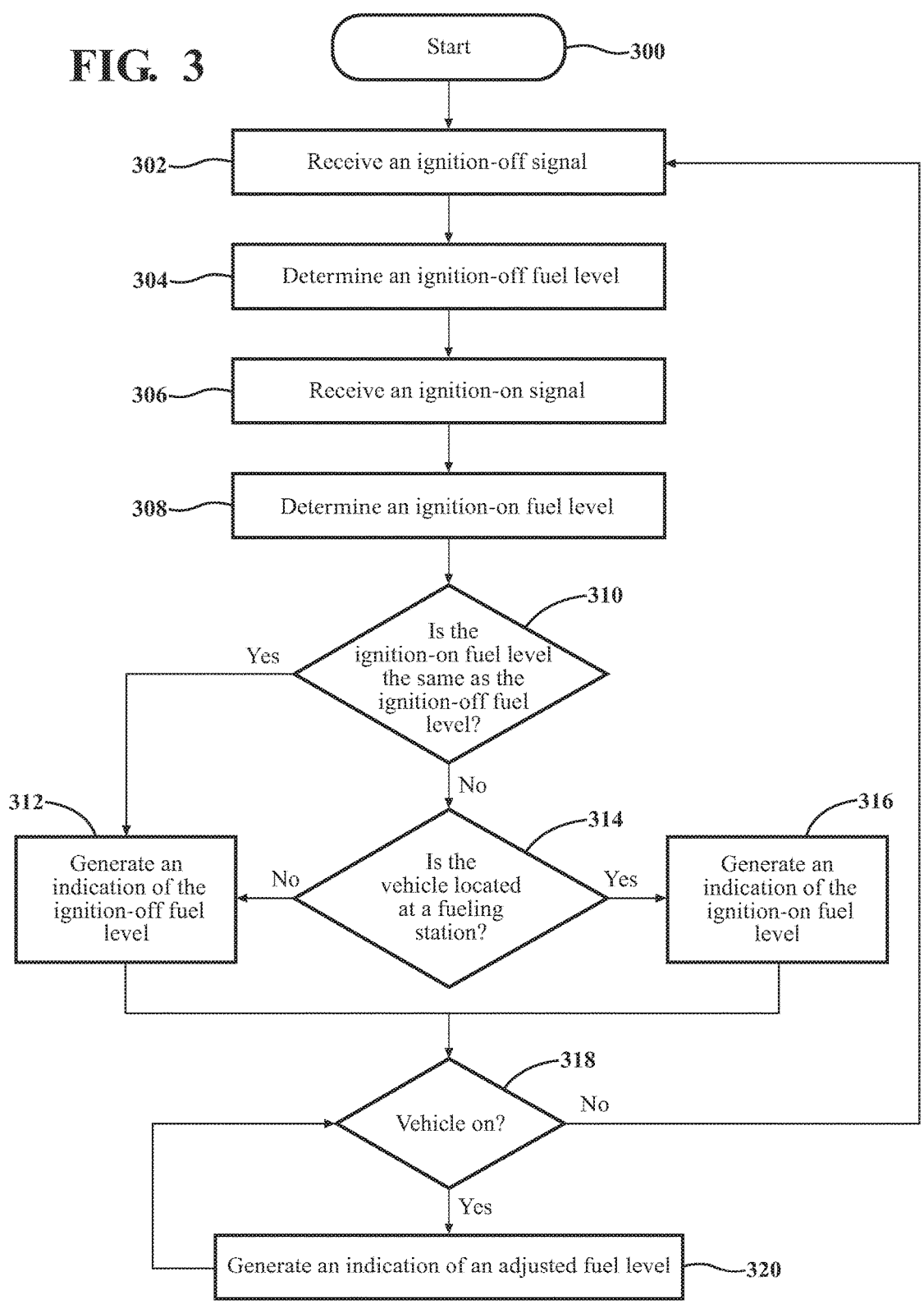

FUEL LEVEL INDICATION IN A VEHICLE

TECHNICAL FIELD

The present disclosure generally relates to fuel levels and, more particularly, to the indication of fuel levels in a vehicle.

BACKGROUND

Many vehicles run on fuel (e.g., gasoline). Additionally, many vehicles running on fuel provide a fuel indicator that displays or otherwise indicates a fuel level in the vehicle. The operators are capable of knowing when the vehicle needs to be refueled based on the indication as provided by the fuel indicator. As such, operators and/or owners may refuel their vehicles from time to time, as needed.

In some instances, the operator may not be the owner of the vehicle. For example, the operator may rent the vehicle for temporary use. Many rental agreements incentivize returning the vehicle with substantially the same fuel level as was present in the vehicle at the beginning of the rental agreement. As one example, operators may incur high service fees for each gallon of gasoline below the original fuel level.

SUMMARY

Generally, the indication of a fuel level in a vehicle is disclosed herein. The fuel level can be indicated within the vehicle based, at least in part, on a location of the vehicle with respect to a fueling station. In this regard, even when a small amount of fuel is added to the vehicle, the additional fuel can be accounted for in the indication by basing the indication on the location of the vehicle.

In one example, a system for indicating a fuel level in a vehicle is disclosed. The system can include a fuel level sensor. The system can also include a processor operatively connected to the fuel level sensor. The system can also include memory operatively connected to the processor. The memory can store an ignition monitoring module including instructions that, when executed by the processor, cause the processor to receive, from an ignition switch, an ignition-on signal. The memory can also store a fuel level module including instructions that, when executed by the processor, cause the processor to determine an ignition-on fuel level based, at least in part, on data received from the fuel level sensor upon receiving the ignition-on signal. The memory can also store a location module including instructions that, when executed by the processor, cause the processor to determine a location of the vehicle with respect to one of a plurality of fueling stations. The memory can also store a user interface module including instructions that, when executed by the processor, cause the processor to generate an indication of the ignition-on fuel level within a user interface of the vehicle upon receiving the ignition-on signal when the vehicle is located at the one of the plurality of fueling stations.

In another example, a system for indicating a fuel level in a vehicle is disclosed. The system can include a processor. The system can also include memory operatively connected to the processor. The memory can store an ignition monitoring module including instructions that, when executed by the processor, cause the processor to receive an ignition-on signal and an ignition-off signal. The memory can also store a fuel level module including instructions that, when executed by the processor, cause the processor to determine an ignition-on fuel level upon receiving the ignition-on signal based, at least in part, on data received from a fuel level sensor. The fuel level module can also include instructions to determine an ignition-off fuel level upon receiving the ignition-off signal based, at least in part, on data received from the fuel level sensor. The fuel level module can also include instructions determine whether the ignition-on fuel level is within a threshold of the ignition-off fuel level. The memory can also store a location module including instructions that, when executed by the processor, cause the processor to determine a location of the vehicle with respect to a nearest one of a plurality of fueling stations. The memory can also store a user interface module including instructions that, when executed by the processor, cause the processor to generate an indication of the ignition-on fuel level within a user interface of the vehicle in response to (i) the ignition-on fuel level being within the threshold of the ignition-off fuel level and (ii) the vehicle being located at the nearest one of the plurality of fueling stations.

In another example, a method of indicating a fuel level in a vehicle is disclosed. In response to receiving an ignition-on signal from the vehicle being activated, the method can include acquiring, from a fuel level sensor, data corresponding to a fuel level present in a fuel tank of the vehicle. The method can also include, in response to determining the vehicle is located at one of a plurality of fueling stations, generating an indication of the fuel level within a user interface of the vehicle.

BRIEF DESCRIPTION OF THE DRAWINGS

FIG. 3 illustrates another example method of indicating a fuel level in a vehicle.

DETAILED DESCRIPTION

In general, the present disclosure describes the indication of a fuel level in a vehicle. The vehicle may include a fuel level sensor that generates data corresponding to a fuel level in a fuel tank of the vehicle. In some instances, the vehicle may be a rental vehicle. In these instances, the driver may want to return the vehicle with the same amount of fuel as was received. For example, a rental agreement for the rental vehicle may include a provision that incentivizes the driver to return the vehicle with substantially the same fuel level as was present in the vehicle at the beginning of the rental so as to not incur any fees. The driver may use a minor amount of fuel during the duration of the rental. As a result, the driver may add a small amount of fuel prior to returning the vehicle to the rental service location. However, the vehicle may filter fuel level data from the fuel level sensor to account for slosh within the fuel tank. As a result, the minor amount of fuel added to the fuel tank may not be represented in the indication of the fuel level by the time the vehicle is returned to the rental service location. In this case, the driver may end up owing money according to the rental agreement, even though the driver fulfilled their obligations under the agreement by returning the vehicle with substantially the same amount of fuel.

Therefore, in one aspect of the present disclosure, present systems and methods are disclosed that monitor the ignition switch to determine whether the vehicle is on or off. Also, the systems and methods can determine a fuel level when the state of the vehicle changes (e.g., switches from on to off, and vice versa). When the fuel level at the on state (e.g., ignition-on fuel level) is different from the fuel level at the off state, the systems and methods can determine whether the vehicle is located at a fueling station. If the vehicle is located at the fueling station, the systems and methods can generate an indication of the ignition-on fuel level within a user interface that is not filtered to account for slosh. As a result, any minor additions of fuel to the fuel tank should be reflected in the indication on the user interface because the systems and methods actively account for indicating added fuel without filtering the indicator for slosh when the vehicle is located at a fueling station. In this way, disparities between actual fuel levels and indicated fuel levels can be accounted for under the noted circumstances.

Figure 1:
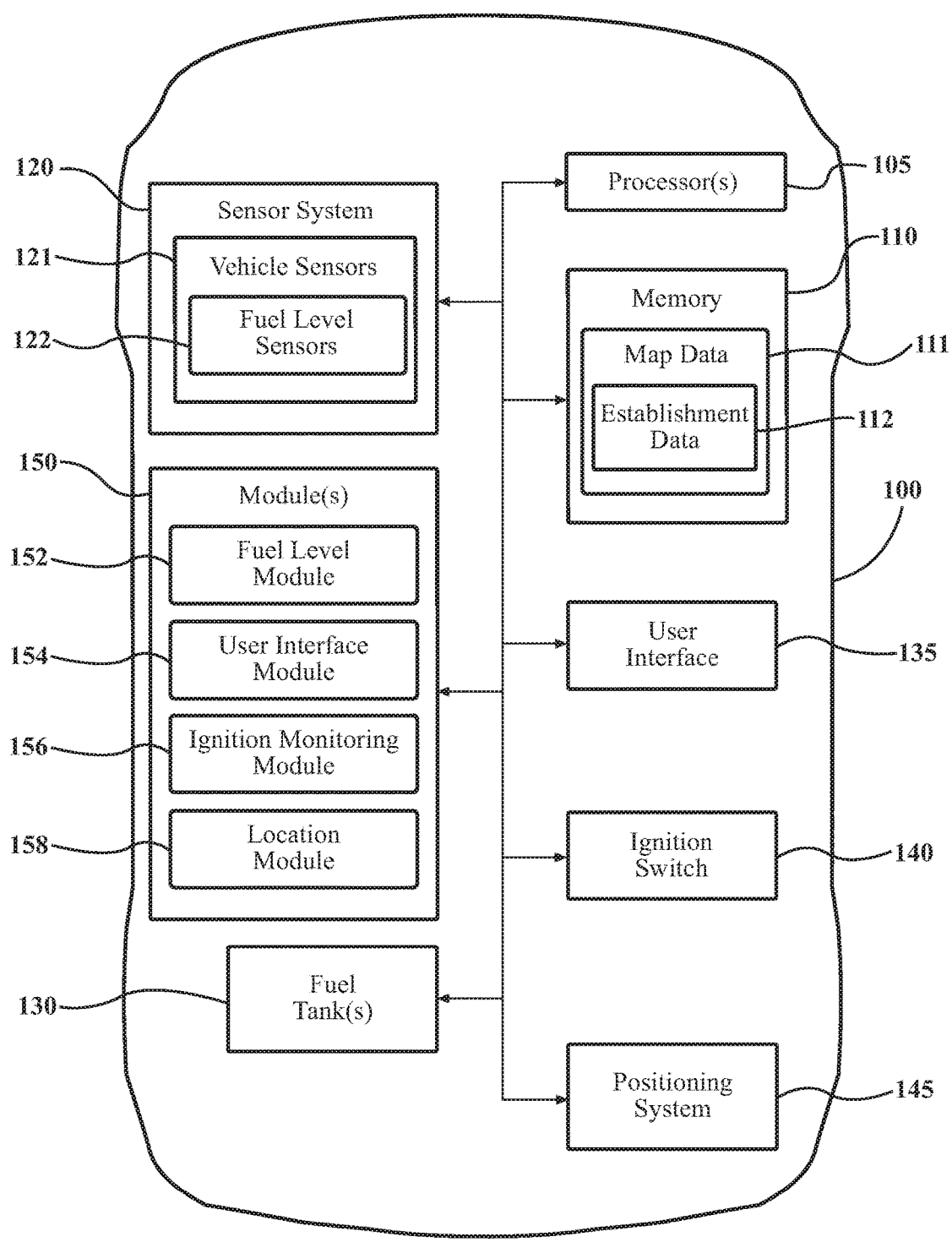
FIG. 1 is a schematic view of a vehicle.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that examples are not limited to automobiles. Many other types of vehicles can similarly benefit from the fuel indication arrangements disclosed herein.

The vehicle 100 includes various elements. It will be understood that, in various examples, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The vehicle 100 includes one or more processor(s) 105. The processor(s) 105 are configured to implement or perform various functions described herein. In one or more arrangements, the processor(s) 105 can be a main processor of the vehicle 100. For instance, the processor(s) 105 can be an electronic control unit (ECU).

The vehicle 100 can include memory 110 for storing one or more types of data. The memory 110 store can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 110 can be a component of the processor(s) 105, or the memory 110 can be operatively connected to the processor(s) 105 for use thereby. The term "operatively connected," as used throughout this description, can include direct or indirect connections, including connections without direct physical contact.

In one or more arrangements, the memory 110 can include map data 111. The map data 111 can include maps of one or more geographic areas. In some instances, the map data 111 can include information or data on roads, traffic control devices, road markings, structures, features, and/or landmarks in the one or more geographic areas. The map data 111 can be in any suitable form.

In one or more arrangements, the map data 111 can include information or data on businesses and/or establishments in the one or more geographic areas. Such information and data can be stored as establishment data 112. For example, the establishment data 112 can include information related to the type of business, name of the business, hours, phone number, etc. In one or more arrangements, one or more of the establishments may be a fueling station. In this regard, the establishment data 112 may include information or data on the location of one or more fueling stations in a geographic area. Additionally, in some arrangements, the establishment data 112 can include information or data on the location of one or more other businesses or establishments. For example, the establishment data 112 can include information or data on the location of airport(s), rental car service location(s), etc.

The vehicle 100 can include a sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process. The sensor system 120 and/or the one or more sensors can be operatively connected to the processor(s) 105, the memory 110, and/or another element of the vehicle 100 (including any of the elements shown in FIG. 1). As will be understood below, the sensor system 120 can be used by the processor(s) 105 to perform various functions. The sensor system 120 can include, for example, one or more vehicle sensor(s) 121. The vehicle sensor(s) 121 can be configured to monitor, assess, detect, and/or evaluate one or more conditions in the vehicle 100.

In one or more arrangements, the vehicle sensor(s) 121 can include one or more fuel level sensor(s) 122. In one or more arrangements, the fuel level sensor(s) 122 can be or include a potentiometer and a float. In this example, as the fuel level changes, the float moves within a fuel tank 130. The float moving within the fuel tank 130 can result in changes to the resistance of the potentiometer. As such, the resistance of the potentiometer changes with changes in the fuel level. In one or more arrangements, the fuel level sensor(s) 122 can include a radar, sonar, LIDAR, or other sensor that transmits a signal and generates data responsive to detecting the transmitted signal. In this example, the fuel level sensor(s) 122 can be mounted near the inlet of the fuel tank 130. The fuel level sensor(s) 122 can transmit a signal towards fuel in the fuel tank 130. The signal can be reflected off the fuel and received by the fuel level sensor(s) 122. The fuel level sensor(s) 122 can generate data corresponding to the time it takes to receive the transmitted signal. Based on the data, the fuel level sensor(s) 122 can determine a fuel level in the fuel tank 130. Although these two examples are provided for types of fuel level sensor(s) 122, many other types of fuel level sensor(s) 122 may be used. Accordingly, the present disclosure is not limited to these types of fuel level sensor(s) 122.

In one or more arrangements, the memory 110 can include various instructions stored thereon. In one or more arrangements, the memory 110 can store one or more modules 150. Modules can be or include computer-readable instructions that, when executed by the processor 105, cause the processor 105 to perform the various functions disclosed herein. While the modules will be described herein with reference to functions for purposes of brevity, it should be understood that the modules include instructions that cause the processor(s) 105 to perform the described functions. Further, while one or more modules 150 can be stored on memory 110, it should be noted the various modules can be stored on and/or be a component of the processor(s) 105, can be remotely stored and accessible by the processor(s), etc.

In one or more arrangements, the vehicle 100 can include a fuel level module 152. The fuel level module 152 can include instructions that cause the processor(s) 105 to receive data acquired and/or generated by the fuel level sensor(s) 122. In this regard, the data can correspond to the fuel level in the fuel tank 130 of the vehicle 100. In some arrangements, the fuel level module 152 can continuously receive data from the fuel level sensor(s) 122. In other arrangements, the fuel level module 152 can receive data from the fuel level sensor(s) 122 in intervals (e.g., temporal intervals, distance traveled intervals, etc.). In other arrangements, the fuel level module 152 can prompt the fuel level sensor(s) 122 to acquire and/or generate data. As such, the fuel level module 152 can include various arrangements to monitor and/or determine the fuel level in the fuel tank 130 of the vehicle 100 over time.

In some arrangements, the fuel level module 152 can include instructions to filter data received by the fuel level sensor(s) 122. The fuel level module 152 can apply weighted filters that add weight to previously-received data, can perform a straight average of data received from the fuel level sensor(s) 122, and/or any other types of filters or methods of filtering fuel level data. In this regard, the fuel level module 152 can filter the data to provide an adjusted fuel level. The adjusted fuel level can account for slosh within the fuel tank 130 of the vehicle. "Slosh," as used herein, can include the movement of a fluid in an enclosed space or container. Some examples of slosh within the fuel tank 130 can be a result of acceleration of the vehicle 100, the vehicle 100 being parked on a slope, etc. Therefore, the adjusted fuel level, which accounts for slosh in the fuel tank 130, may or may not be the same as the actual fuel level in the fuel tank 130. For example, where a minor amount of fuel is added to the fuel tanks 130, the minor addition may not be immediately reflected in an indication due to the filter. However, over time, and as the fuel level module 152 continues to detect slight variations of the fuel level (due to the minor addition of fuel), the minor addition of fuel will eventually be reflected in the adjusted fuel level.

In one or more arrangements, the vehicle 100 can include a user interface 135. The user interface 135 can be or include any device and/or component(s) of the vehicle 100 that provides and/or receives information to and/or from an occupant of the vehicle 100. The user interface 135 can be a display, instrument panel or cluster, an audio system, a haptic feedback system, etc. The user interface 135 can be configured to indicate a fuel level to an occupant of the vehicle 100.

In one or more arrangements, the vehicle 100 can include a user interface module 154. The user interface module 154 can include instructions to generate indications of the fuel level within the user interface 135. As will be discussed in greater detail below, the user interface module 154 can generate different indications of the fuel level according to various factors and/or parameters of the vehicle 100.

In one or more arrangements, the vehicle 100 can include an ignition switch 140. The ignition switch 140 can be or include any device(s) and/or component(s) of the vehicle 100 that control the power supply of the vehicle 100. The ignition switch 140 can activate and/or deactivate an engine and/or battery(s) of the vehicle 100. The ignition switch 140 can be controlled by the occupant (e.g., driver) of the vehicle 100. In some examples, the occupant can engage a key or key fob to an ignition of the vehicle 100. Responsive to the vehicle 100 confirming the key or key fob is authorized, the vehicle 100 can actuate the ignition switch 140. In examples where the vehicle 100 includes a remote keyless entry system, upon the occupant entering the vehicle 100 with an authorized key, the occupant can select a button that actuates the ignition switch 140. The ignition switch 140 can be in an on state (e.g., engine-on state), an off state (e.g., engine-off state), an ACC state (e.g., accessory-on state), etc. Further, an occupant of the vehicle 100 can change the ignition switch 140 between the various states.

In one or more arrangements, the vehicle 100 can include an ignition monitoring module 156. The ignition monitoring module 156 can include instructions to monitor a state of the ignition switch 140. The ignition monitoring module 156 can generate one or more signals corresponding to the state of the ignition switch 140. For example, the ignition monitoring module 156 can generate an ignition-on signal in response to the ignition switch 140 being in an on state, an ignition-off signal in response to the ignition switch 140 being in an off state, etc. In these arrangements, various components of the vehicle 100, such as the fuel level sensor(s) 122, user interface 135, etc., can be controlled according to the state of the ignition switch 140.

In some arrangements, the fuel level module 152 can further include instructions to prompt the fuel level sensor(s) 122 to acquire and store data for the fuel level responsive to detecting a change in the state of the ignition switch 140. The fuel level module 152 can store the data in, for example, memory 110. In arrangements where the fuel level module 152 continuously receives data from the fuel level sensor(s) 122, the fuel level module 152 can include instructions to store data from the fuel level sensor(s) 122 responsive to detecting a change in the state of the ignition switch 140. In any of these arrangements, the fuel level module 152 includes instructions to determine an ignition-on fuel level, an ignition-off fuel level, etc. Therefore, in examples where the vehicle 100 is being refueled, the fuel level module 152 can store an ignition-off fuel level when the vehicle 100 is turned off to be refueled, and the fuel level module 152 can store an ignition-on fuel level when the vehicle 100 is turned back on upon being refueled.

In one or more arrangements, the fuel level module 152 includes instructions to compare the stored ignition-off fuel level to the ignition-on fuel level. The fuel level module 152 can include instructions to determine whether the ignition-off fuel level and the ignition-on fuel level are the same. Based on the comparison, the user interface 135 can indicate different fuel levels. For example, where the ignition-off fuel level and ignition-on fuel level are the same, the user interface module 154 can generate an indication of the ignition-off fuel level. While the present disclosure states "the same", it should be understood that the present disclosure includes minor deviations from the same (e.g., substantially the same). For example, the fuel level module 152 can determine where the ignition-off fuel level and the ignition-on fuel level are the same, or within a minor difference (e.g., <+/− 1%, <+/− X oz., etc.) from one another. Furthermore, while this example is provided, it is noted that the user interface module 154 can similarly generate an indication of the ignition-on fuel level where the ignition-off fuel level and ignition-on fuel level are the same. Incidentally, in most arrangements, the indication of both the ignition-off fuel level and the ignition-on fuel level will be the same, even where the respective fuel levels are not exactly the same. Therefore, the present disclose is not limited to either arrangement.

Where the ignition-off fuel level and ignition-on fuel level are different, the user interface module 154 can selectively generate an indication of the ignition-on or ignition-off fuel level according to various inputs. As will be discussed in greater detail below, the user interface module 154 can selectively generate an indication of the ignition-on or ignition-off fuel level according to the location of the vehicle 100.

In one or more arrangements, where the ignition-on fuel level is different from the ignition-off fuel level, the fuel level module 152 can determine whether the ignition-on fuel level is within a threshold of the ignition-off fuel level. The threshold can be a predetermined amount of fuel. For example, the threshold can be volume of fuel (e.g., gallon(s), liter(s), etc.). Further, the threshold can be a function of the size of the fuel tank 130. In this example, the threshold can be larger for larger fuel tanks, and smaller for smaller fuel tanks. Where the ignition-on fuel level is greater than the ignition-off fuel level by the threshold, the fuel level module 152 can determine that the vehicle 100 has been refueled. Where the vehicle 100 is determined to have been refueled, the user interface module 154 can generate an indication of the ignition-on fuel level. However, where the ignition-on fuel level is within the threshold of the ignition-off fuel level (e.g., greater than the ignition-off fuel level by less than the threshold), such a result can occur due to a number of factors. For example, the vehicle 100 may have been parked on a sloped surface, the vehicle 100 may have been moved, a small of amount of fuel may have been added to the fuel tank 130, etc. It should be understood that, where the ignition-on fuel level is less than the ignition-off fuel level, the user interface module 154 can generate an indication of any one of the ignition-on and/or the ignition-off fuel level according to various inputs.

In one or more arrangements, the vehicle 100 can include a positioning system 145. The positioning system 145 can include one or more devices, components and/or combinations thereof configured to determine the geographic location of the vehicle 100. The positioning system 145 can include one or more mapping applications and/or have access to the map data 111.

The positioning system 145 can include a global positioning system, a local positioning system and/or a geolocation system. The positioning system 145 can be implemented with any one of a number of satellite positioning systems, such as the United States Global Positioning System (GPS), the Russian Glonass system, the European Galileo system, the Chinese Beidou system, etc. The positioning system 145 may include a transceiver configured to estimate and/or determine a position of the vehicle 100 with respect to the Earth. For example, the positioning system 145 can include a GPS transceiver to determine the vehicle's latitude, longitude and/or altitude. The positioning system 145 can use other systems (e.g. laser-based localization systems, inertial-aided GPS, and/or camera-based localization) to determine the location of the vehicle 100.

In one or more arrangements, the vehicle 100 can include a location module 158. The location module 158 can include instructions to determine a location of the vehicle 100 with respect to map data 111 stored on memory 110 based on data from the positioning system 145. The location module 158 can access the establishment data 112 stored on memory 110 to determine the location of the vehicle 100 with respect to one or more businesses and/or establishments. For example, the location module 158 can use the current location of the vehicle 100 (as determined via the positioning system 145) and access the establishment data 112. Upon accessing the establishment data 112, the location module 158 can determine whether the vehicle 100 is located at any businesses or establishments such as, for example, a fueling station. For example, the location module 158 can access the establishment data 112 to determine the nearest fueling station to the location of the vehicle 100. The location module 158 can compare the location of the nearest fueling station to the location of the vehicle 100. If the locations are substantially the same, the location module 158 can determine that the vehicle 100 is located at a fueling station. Therefore, the location module 158 can include instructions to determine whether the vehicle 100 is located at any fueling stations. While this example of determining whether the vehicle 100 is located at a fueling station, many other examples can be used, such as cameras and image processing techniques, for example. Accordingly, the present disclosure is not limited to this example.

In some arrangements, the location module 158 can first determine whether the vehicle 100 is located at a fueling station. Upon determining the vehicle 100 is located at a fueling station, the location module 158 can determine whether the fueling station that the vehicle 100 is located at is within a predetermined distance from another business or establishment. The predetermined distance can be, for example, a number of miles, an average travel time. For example, the location module 158 can determine whether the fueling station is within a predetermined distance from any airport(s) or car rental service location(s). The predetermined distance can be used, for example, to determine whether it is likely that the driver intends to return the vehicle 100 to a car rental service location. Similar to the example presented above in regards to the fueling stations, the location module 158 can access the establishment data 112 to determine the nearest airport and/or car rental service location. The location module 158 can compare the location of the nearest airport and/or car rental service location to the current location of the vehicle 100 (as determined by the positioning system 145) to determine whether the vehicle 100 is within the predetermined distance from the nearest airport and/or car rental service location.

The fuel level module 152 can determine, based on the location of the vehicle 100, whether it is likely that the vehicle 100 was refueled. For example, where the ignition-on fuel level is within the threshold of the ignition-off fuel level, a small amount of fuel may have been added to the fuel tank 130. Where the vehicle 100 is located at a fueling station, it is more likely that the vehicle 100 has been refueled. Therefore, in one or more arrangements, where the ignition-on fuel level is greater than the ignition-off fuel level and the vehicle 100 is located at a fueling station, the fuel level module 152 can determine that the vehicle 100 has likely been refueled. Furthermore, where the vehicle 100 ignition-on fuel level is greater than the ignition-off fuel level, and the vehicle 100 is located at a fueling station that is in close proximity to an airport or a car rental service location, it is likely that a small amount of fuel was added to the fuel tank 130 to satisfy the requirements of a car rental agreement. Where the vehicle 100 is determined to have likely been refueled, the user interface module 154 can generate an indication of the ignition-on fuel level. In this regard, the ignition-on fuel level may not have been filtered to account for slosh. Therefore, the user interface module 154 can generate an indication of the fuel level that reflects any minor additions of fuel to the fuel tank 130 by actively accounting for indicating added fuel without filtering the data for slosh when the vehicle 100 is located at a fueling station. In this way, disparities between actual fuel levels and indicated fuel levels can be accounted for under these circumstances.

Figure 2:
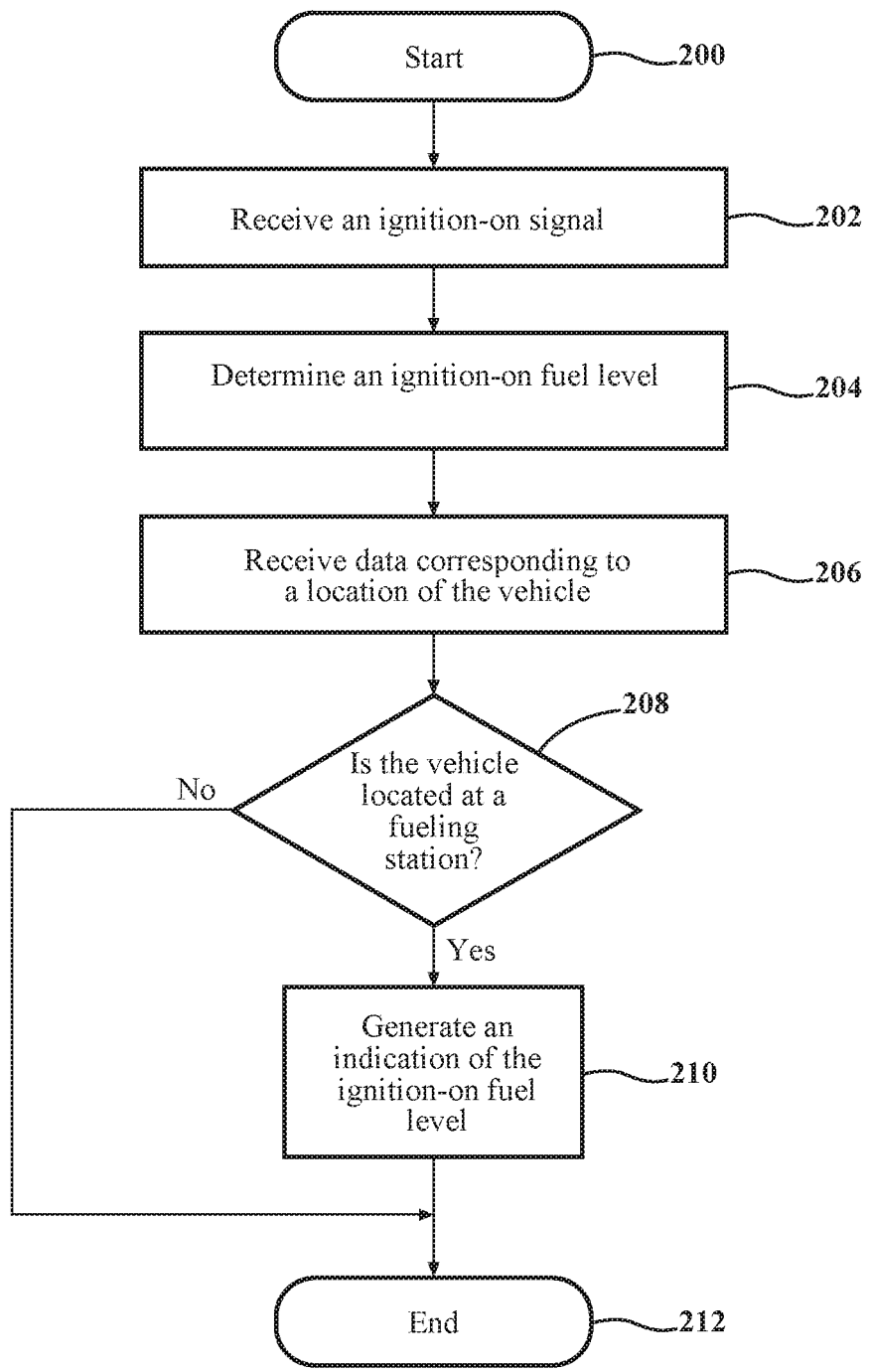
FIG. 2 illustrates an example method of indicating a fuel level in a vehicle.

Now that various aspects of the vehicle 100 have been disclosed, a method of indicating a fuel level in a vehicle will be described with reference to FIG. 2. The flowchart shown in FIG. 2 is only for exemplary purposes. The following disclosure should not be limited to each and every function block shown in FIG. 2. To the contrary, the method does not require each and every function block shown. In some examples, the method can include additional function blocks. Further, the method does not need to be performed in the same chronological order shown in FIG. 2. To the extent possible, reference will be made to the structure described above.

The method can begin at starting block 200. In some arrangements, the method can begin in response to receiving an ignition-off signal. In other arrangements, the method can begin when the ignition switch 140 is switched to the on state and/or the ACC state. The method can continue to function block 202.

At function block 202, the ignition monitoring module 156 can receive an ignition-on signal from the ignition switch 140. The ignition monitoring module 156 can monitor the ignition switch 140 to determine, based on signals from the ignition switch 140, the current state of the ignition switch 140. As a result, when the ignition switch 140 changes from any state to the on state, the ignition monitoring module 156 can receive the ignition-on signal. The method can continue to function block 204.

At function block 204, the fuel level module 152 can include instructions to receive data acquired and/or generated by the fuel level sensor(s) 122. The data can correspond to the fuel level in the fuel tank 130 of the vehicle 100. The fuel level module 152 can receive data from the fuel level sensor(s) 122 in response to receiving the ignition on signal at function block 202. In this regard, the fuel level module 152 can determine an ignition-on fuel level. In one or more arrangements, the fuel level module 152 can receive data acquired and/or generated by the fuel level sensor(s) 122 in response to the ignition monitoring module 156 receiving the ignition-on signal. In some arrangements, the fuel level module 152 can prompt the fuel level sensor(s) 122 to acquire data. In both arrangements, the fuel level module 152 can receive data corresponding to the ignition-on fuel level (e.g., the fuel level detected when the vehicle 100 is turned on). The method can continue to function block 206.

At function block 206, the location module 158 can receive data corresponding to the location of the vehicle 100. The location module 158 can receive the data from the positioning system 145 corresponding to the location of the vehicle 100. The location module 158 can also access map data 111 stored on memory 110. In some arrangements, the location module 158 can compare the location of the vehicle 100 to establishment data 112. The method can continue to decision block 208.

At decision block 208, the location module 158 can determine whether the vehicle 100 is located at a fueling station. The establishment data 112 on memory 110 can include a plurality of fueling stations for a geographic location. The location module 158 can include instructions to compare the location of the vehicle 100 with the establishment data 112 to determine whether the vehicle 100 is located at any one of the plurality of fueling stations stored in memory 110. If the vehicle 100 is located at a fueling station, the method can continue to function block 210. If the vehicle 100 is located at a location other than a fueling station, the method can continue to ending block 212.

At function block 210, the user interface module 154 can include instructions to generate an indication of the ignition-on fuel level detected at function block 204. The user interface module 154 can generate the indication on the user interface 135. The indication can in some arrangements be generated on a gauge on a display or an instrument panel. The method can continue to ending block 212.

At ending block 212, the method can end. The method can end as a result of, at function block 210, the user interface module 154 generating an indication of the ignition-on fuel level. The method can also end as a result of, at decision block 208, the vehicle 100 being at a location other than any one of the plurality of fueling stations.

Referring now to FIG. 3, another method of indicating a fuel level in a vehicle will be described. Similar to FIG. 2, the flowchart shown in FIG. 3 is only for exemplary purposes. The following disclosure should not be limited to each and every function block shown in FIG. 3. To the contrary, the method does not require each and every function block shown. In some examples, the method can include additional function blocks. Further, the method does not need to be performed in the same chronological order shown in FIG. 3. To the extent possible, reference will be made to the structure described above.

The method can begin at starting block 300. In some arrangements, the method can begin in response to receiving an ignition-off signal. In other arrangements, the method can begin when the ignition switch 140 is in the on state and/or the ACC state. The method can continue to function block 302.

At function block 302, the ignition monitoring module 156 can receive an ignition-off signal from the ignition switch 140. The ignition monitoring module 156 can monitor the ignition switch 140 to determine, based on signals from the ignition switch 140, the current state of the ignition switch 140. As a result, when the ignition switch 140 changes from any state to the off state, the ignition monitoring module 156 can receive the ignition-off signal. The method can continue to function block 304.

At function block 304, the fuel level module 152 can include instructions to receive data acquired and/or generated by the fuel level sensor(s) 122. The data can correspond to the fuel level in the fuel tank 130 of the vehicle 100. The fuel level module 152 can receive data from the fuel level sensor(s) 122 in response to receiving the ignition-off signal at function block 302. In this regard, the fuel level module 152 can determine an ignition-off fuel level. In one or more arrangements, the fuel level module 152 can prompt the fuel level sensor(s) 122 to generate and/or acquire data in response to the ignition monitoring module 156 receiving the ignition-off signal. In this regard, the fuel level module 152 can receive the data generated and/or acquired by the fuel level sensor(s) 122 prior to the vehicle 100 being turned off. In other arrangements, the fuel level module 152 can iteratively and/or continuously receive data from the fuel level sensor(s) 122. In this regard, the fuel level module 152 can classify the most recent data received from the fuel level sensor(s) 122 prior to receiving the ignition-off signal as the ignition-off fuel level. In both arrangements, the fuel level module 152 can receive data corresponding to the ignition-off fuel level (e.g., the fuel level detected when the vehicle 100 is turned off). In one or more arrangements, the fuel level module 152 can store the ignition-off fuel level on memory 110. The method can continue to function blocks 306-308, which are substantially the same as the steps performed at function blocks 202-204 of FIG. 2, respectively. From function block 308, the method can continue to decision block 310.

At decision block 310, the fuel level module 152 includes instructions to compare the stored ignition-off fuel level to the ignition-on fuel level. The fuel level module 152 can include instructions to determine whether the ignition-off fuel level and the ignition-on fuel level are the same (or substantially the same). Where the ignition-on fuel level is the same (or substantially the same) as the ignition-off fuel level, the method can continue to function block 312.

At function block 312, the user interface module 154 can generate an indication of the ignition-off fuel level detected at function block 304. The user interface module 154 can generate the indication on the user interface 135. The indication can in some arrangements be generated on a gauge, a display, an instrument panel, etc. While this example is provided, it is noted that, where the ignition-off fuel level and ignition-on fuel level are the same (or substantially the same), the user interface 154 can similarly generate an indication of the ignition-on fuel level detected at function block 308. Therefore, the present disclosure is not limited to either arrangement. However, referring back to decision block 310, where the ignition-on fuel level is not the same (or substantially the same) as the ignition-off fuel level, the method can continue to decision block 314.

At decision block 314, the location module 158 can determine whether the vehicle 100 is located at a fueling station. The establishment data 112 can include a plurality of fueling stations for a geographic location. The location module 158 can include instructions to compare the location of the vehicle 100 with the establishment data 112 to determine whether the vehicle 100 is located at any one of the plurality of fueling stations stored in memory 110. If the vehicle 100 is at a location other than a fueling station, the method can continue to function block 312 described above. However, if the vehicle 100 is located at a fueling station, the method can continue to function block 316.

At function block 316, the user interface module 154 can include instructions to generate an indication of the ignition-on fuel level detected at function block 308. Function block 316 can be the same or substantially the same as function block 210 of FIG. 2. From both function block 312 and 316, the method can continue to decision block 318.

At decision block 318, the ignition monitoring module 156 can determine whether the vehicle 100 is in an on state (or an ACC on state). The ignition monitoring module 156 can monitor the ignition switch 140 to determine, based on signals from the ignition switch 140, the current state of the ignition switch 140. As a result, when the ignition switch 140 changes from the on state to the off state, the method can continue back to function block 302. However, if the ignition switch 140 is in the on state, the method can continue to function block 320.

At function block 320, the user interface module 154 can include instructions to generate an indication of an adjusted fuel level. In one or more arrangements, the fuel level module 152 can include instructions to filter data received by the fuel level sensor(s) 122. In this regard, the fuel level module 152 can filter the data to provide an adjusted fuel level, which is indicated via the user interface module 154. The adjusted fuel level can account for slosh within the fuel tank 130 of the vehicle 100. Therefore, the adjusted fuel level may or may not be the same as the actual fuel level in the fuel tank 130. From function block 320, the method can continue back to decision block 318. In this regard, function block 320 can be performed so long as the vehicle is in the on state. Worth noting, in some arrangements, data is only filtered at function block 320. In this regard, data received from the fuel level sensor(s) 122 at function block 304 and 308 may or may not be filtered.

In one or more arrangements, at decision block 314, the location module 158 can first determine whether the vehicle 100 is located at a fueling station. Upon determining the vehicle 100 is located at a fueling station, the location module 158 can determine whether the fueling station that the vehicle 100 is located at is within a predetermined distance from another business or establishment. For example, the location module 158 can determine whether the fueling station is within a predetermined distance from any airport(s) or car rental service location(s). In response to the fueling station being within the predetermined distance from any airport(s) and/or car rental service location(s), the method can continue to function block 316. However, in response to the fueling station not being within the predetermined distance from any airport(s) and/or car rental service location(s), the method can continue to function block 312.

It will be appreciated that arrangements described herein can provide numerous benefits, including one or more of the benefits mentioned herein. For example, arrangements described herein can provide reliable and accurate fuel level data. Arrangements described herein can indicate a more accurate fuel level in response to a minor amount of fuel being added to the vehicle. Arrangements described herein can expedite the time it takes to reflect a minor increase in fuel added to a vehicle. Arrangements described herein can save car renter's money by indicating more accurate fuel levels.

Detailed examples are disclosed herein. However, it is to be understood that the disclosed examples are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various examples are shown in FIGS. 1-3, but the examples are not limited to the illustrated structure or application.

The flowcharts and block diagrams in the figures illustrate the architecture, functionality, and operation of possible implementations of systems, methods and computer program products according to various examples. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the maintenance conditions enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for indicating a fuel level in a vehicle, comprising:
   a processor,
   and memory operatively connected to the processor, the memory storing:
   ignition monitoring module instructions that, when executed by the processor, cause the processor to receive an ignition-on signal and an ignition-off signal;
   fuel level module instructions that, when executed by the processor, cause the processor to
      determine an ignition-on fuel level upon receiving the ignition-on signal based, at least in part, on data received from a fuel level sensor,
      determine an ignition-off fuel level upon receiving the ignition-off signal based, at least in part, on data received from the fuel level sensor, and
      determine whether the ignition-on fuel level is within a threshold of the ignition-off fuel level;
   location module instructions that, when executed by the processor, cause the processor to determine a location of the vehicle with respect to a nearest one of a plurality of fueling stations; and
   user interface module instructions that, when executed by the processor, cause the processor to generate an indication of the ignition-on fuel level within a user interface of the vehicle in response to (i) the ignition-on fuel level being within the threshold of the ignition-off fuel level and (ii) the vehicle being located at the nearest one of the plurality of fueling stations.

2. The system of claim 1, wherein the user interface module instructions include instructions that, when executed by the processor, cause the processor to generate an indication of the ignition-off fuel level in response to (i) the ignition-on fuel level being within the threshold of the ignition-off fuel level and (ii) the vehicle being located at a location other than any of the plurality of fueling stations.

3. The system of claim 1, wherein the user interface module instructions include instructions that, when executed by the processor, cause the processor to generate the indication of the ignition-on fuel level in response to the ignition-on fuel level being greater than the ignition-off fuel level by the threshold.

4. The system of claim 1, wherein the fuel level module instructions include instructions that, when executed by the processor, cause the processor to
   receive, from the fuel level sensor, subsequent data corresponding to the fuel level after determining the ignition-on fuel level, and
   filter the subsequent data to provide an adjusted fuel level that accounts for slosh within a fuel tank of the vehicle.

5. The system of claim 1, wherein the location module instructions include instructions that, when executed by the processor, cause the processor to determine whether the one fueling station is within a predetermined distance from a nearest one of: (i) a plurality of airports and (ii) a plurality of rental car service locations.

6. The system of claim 5, wherein the user interface module instructions include instructions that, when executed by the processor, cause the processor to generate the indication of the ignition-on fuel level within the user interface of the vehicle in response to (i) the ignition-on fuel level being within the threshold of the ignition-off fuel level (ii) the vehicle being located at the any one of the plurality of fueling stations and (iii) the any one fueling station being within the predetermined distance from the nearest one of: (a) the any one of the plurality of airports and (b) the any one of the plurality of rental car service locations.

7. A system for indicating a fuel level in a vehicle, comprising:
a fuel level sensor;
a processor operatively connected to the fuel level sensor; and
memory operatively connected to the processor, the memory storing:
ignition monitoring module instructions that, when executed by the processor, cause the processor to receive an ignition-on signal;
fuel level module instructions that, when executed by the processor, cause the processor to
determine an ignition-on fuel level based, at least in part, on data received from the fuel level sensor upon receiving the ignition-on signal,
determine an ignition-off fuel level based, at least in part, on data received from the fuel level sensor prior to receiving an ignition-off signal, and
determine whether the ignition-on fuel level is within a threshold of the ignition-off fuel level;
location module instructions that, when executed by the processor, cause the processor to determine a location of the vehicle with respect to one of a plurality of fueling stations; and
user interface module instructions that, when executed by the processor, cause the processor to generate an indication of the ignition-on fuel level within a user interface of the vehicle upon receiving the ignition-on signal when the vehicle is located at the one of the plurality of fueling stations and in response to determining (i) the ignition-on fuel level is within the threshold of the ignition-off fuel level and (ii) the vehicle is located at the one of the plurality of fueling stations.

8. The system of claim 7, wherein the user interface module instructions include instructions that, when executed by the processor, cause the processor to generate an indication of the ignition-off fuel level within the user interface in response to (i) the ignition-on fuel level being within the threshold of the ignition-off fuel level and (ii) the vehicle being located at a location other than any of the plurality of fueling stations.

9. The system of claim 7, wherein the fuel level module instructions include instructions that, when executed by the processor, cause the processor to
receive, from the fuel level sensor, subsequent data corresponding to the fuel level after determining the ignition-on fuel level, and
filter the subsequent data to provide an adjusted fuel level that accounts for slosh within a fuel tank of the vehicle.

10. The system of claim 7, wherein the location module instructions include instructions that, when executed by the processor, cause the processor to determine whether the one of the plurality of fueling stations is within a predetermined distance from a nearest one of: (i) a plurality of airports and (ii) a plurality of rental car service locations.

11. A system for indicating a fuel level in a vehicle, comprising:
a fuel level sensor,
a processor operatively connected to the fuel level sensor, and
memory operatively connected to the processor, the memory storing:
ignition monitoring module instructions that, when executed by the processor, cause the processor to receive an ignition-on signal;
fuel level module instructions that, when executed by the processor, cause the processor to determine an ignition-on fuel level based, at least in part, on data received from the fuel level sensor upon receiving the ignition-on signal;
location module instructions that, when executed by the processor, cause the processor to
determine a location of the vehicle with respect to one of a plurality of fueling stations, and
determine whether the one of the plurality of fueling stations is within a predetermined distance from a nearest one of: (i) a plurality of airports and (ii) a plurality of rental car service locations, and
user interface module instructions that, when executed by the processor, cause the processor to generate an indication of the ignition-on fuel level within a user interface of the vehicle upon receiving the ignition-on signal when the vehicle is located at the one of the plurality of fueling stations and in response to (i) the vehicle being located at the one of the plurality of fueling stations and (ii) the one fueling station being within the predetermined distance from the nearest one of: (a) the plurality of airports and (b) the plurality of rental car service locations.

12. A method of indicating a fuel level in a vehicle, comprising:
in response to receiving an ignition-on signal from the vehicle being activated:
acquiring, from a fuel level sensor, data corresponding to a first fuel level present in a fuel tank of the vehicle; and
in response to receiving an ignition-off signal from the vehicle being deactivated:
acquiring, from the fuel level sensor, data corresponding to a second fuel level present in the fuel tank of the vehicle; and
determining whether the first fuel level is within a threshold of the second fuel level;
determining whether the vehicle is located at one of a plurality of fueling stations; and
generating an indication of the first fuel level within a user interface of the vehicle in response to (i) the first fuel level being within the threshold of the second fuel level and (ii) the vehicle being located at the one of the plurality of fueling stations.

13. The method of claim 12, further comprising:
in response to determining the vehicle is located at a location other than any of the plurality of fueling stations, generating an indication of the second fuel level within the user interface of the vehicle in response to (i) receiving the ignition-on signal and (ii) the first fuel level being within the threshold of the second fuel level.

14. The method of claim 12, further comprising:
determining whether the one of the plurality of fueling stations is within a predetermined distance from a nearest one of (i) a plurality of airports and (ii) a plurality of rental car service locations.

15. The method of claim 12, further comprising:
receiving, from the fuel level sensor, data corresponding to a subsequent fuel level after determining the fuel level; and
filtering the data to provide an adjusted fuel level from the subsequent fuel level, the adjusted fuel level accounting for slosh within the fuel tank of the vehicle.

16. A method of indicating a fuel level in a vehicle, comprising:
in response to receiving an ignition-on signal from the vehicle being activated:
acquiring, from a fuel level sensor, data corresponding to the fuel level present in a fuel tank of the vehicle;
determining whether the vehicle is located at one of a plurality of fueling stations;
determining whether the one of the plurality of fueling stations is within a predetermined distance from a nearest one of (i) a plurality of airports and (ii) a plurality of rental car service locations; and
generating an indication of the fuel level within a user interface in response to (i) the vehicle being located at the one of the plurality of fueling stations and (ii) the one fueling station is within the predetermined distance from the nearest one of: (a) the plurality of airports and (b) the plurality of rental car service locations.

* * * * *